United States Patent Office 2,964,189
Patented Dec. 13, 1960

2,964,189
FILTRATION OF TITANIUM CONTAINING EFFLUENTS

Ronald Barron Mooney, Widnes, England, assignor to Imperial Chemical Industries Limited, London, England, a corporation of Great Britain No Drawing. Filed May 31, 1956, Ser. No. 588,243

Claims priority, application Great Britain June 17, 1955

3 Claims. (Cl. 210—80)

This invention relates to methods of filtration and more particularly to a novel method of recovering titanium values by filtration, either in the form of metallic titanium or precipitated titanium compounds.

In processes for the manufacture of metallic titanium, for example in the methods of reducing halides of titanium with alkali metals or alkaline earth metals or with magnesium, an appreciable amount of the metal so produced is not recovered in the main product, but is lost in effluent liquors either as soluble titanium compounds or in the form of metallic titanium. Losses of titanium also take place in chlorination processes where titanium tetrachloride is manufactured and in the preparation of titanium dioxide from titanium minerals by, for example, treatment with sulphuric acid.

We have now found that the titanium values may be recovered from such effluent liquors by filtration through a filter bed consisting of titanium minerals such as ilmenite or rutile, or alternatively, insoluble titanium-containing materials such as titanium slag, titanium carbide, titanium nitride or titanium cyanonitride. According to the present invention therefore a process for the recovery of titanium values from effluents containing the same comprises passing the effluents through a filter bed of insoluble titanium-containing material.

It is of course essential to precipitate out soluble titanium compounds from the effluent liquor before filtration and according to a further feature of our invention this is done by the addition of caustic soda or other alkaline solution. To ensure the most satisfactory filtration we prefer to use the filtration bed material in the form of a graded sand, so that coarser material rests on the bottom of the bed while successive layers above become progressively finer in texture while the uppermost layer consists of titanium-containing material. This method of filtration is of great value in so far as the method makes it possible for the filter residue together with the filter bed material, to be used for the subsequent manufacture of titanium compounds such as titanium tetrachloride by methods of chlorination, or titanium dioxide by for example, sulphuric acid treatment.

In practice it has been found to be advantageous to remove the deposit on the top of the filter bed from time to time, and continue this procedure until filtration is complete; this avoids choking of the filter which otherwise tends to occur. The removed material may then be used in one of the above mentioned processes for the recovery of titanium values. It will be apparent that the material on the bottom of the filter bed will remain undistriburbed throughout, and that as the top material is withdrawn a certain amount of "sand" will be withdrawn at the same time. It is therefore desirable to replenish such losses by the addition of more sand to the filter bed from time to time.

In one method of carrying out our invention the filter used consists of a rectangular mild steel tank, concrete lined, with an effective filter area of 8 ft. x 8 ft., and 6 ft. deep. In order to provide drainage space, the tank is fitted with a double bottom, the upper surface of which carries a number of ½" diameter holes through which the filtrate is withdrawn when filtration is in progress.

The filter bed consists of graded powdered rutile built up on graded quartz on the upper surface of the double bottom in the following manner:

| Layer | Depth | Grading of Rutile or Quartz |
|---|---|---|
| Bottom | 4" | ¾" diameter quartz. |
| Second | 4" | ½" diameter quartz. |
| Third | 4" | ⅛" diameter quartz. |
| Fourth | 4" | ¹⁄₁₆" diameter quartz. |
| Top | 2 ft. | Passing 25 B.S.S. mesh rutile. |

Means are provided for back washing the filter bed with water when necessary while a distributor plate is used to ensure that the feed liquor is evenly distributed over the surface of the bed.

An acidic effluent containing about 1½ lbs. of titanium/m.$^3$ in the form of soluble titanium compounds is neutralised with caustic soda to precipitate titanium values in the form of hydrated titanium oxides. The neutralised effluent is then allowed to flow by gravity through the filter bed at a rate not exceeding 1½ m.$^3$ an hour. When 400 m.$^3$ of effluent has been filtered approximately 4" of titanium residue has accumulated on the top of the bed. The filter is then shut-down and, after draining, 2,010 lb. of wet residues are removed from the filter. At the same time approximately 2" of the top layer of the bed are removed and the filter bed backwashed with water for ½ hour. The bed is then remade by replacing 2" of —25 British Standard Sieve rutile, after which the filter is ready for re-use.

The wet residues should have a titanium content of approximately 28% equivalent to a filtration recovery of over 90%. This material is then mixed with the rutile which has been removed from the filter and the mixture dried to give a product suitable for the manufacture of titanium compounds such as titanium tetrachloride.

What I claim is:

1. A process for the recovery by filtration of titanium values from an effluent selected from the group consisting of effluents containing metallic titanium fines and effluents containing precipitated titanium compounds, which comprises passing said effluent through a filter bed composed of graded sand, the coarsest layer lying at the bottom of the bed, while succeeding upper layers are of finer texture, the uppermost layer consisting essentially of insoluble titanium-containing material.

2. The process of claim 1 wherein said titanium containing material is selected from the group consisting of particulate rutile, ilmenite, titanium slag, titanium carbide, titanium nitride, and titanium cyanonitride.

3. The process of claim 1 wherein the titanium values recovered by filtration are removed along with a portion of the top layer of the particulate filter bed of insoluble titanium-containing material, and wherein the filter bed is maintained by replenishing the layer of the insoluble titanium-containing material.

References Cited in the file of this patent

UNITED STATES PATENTS

| 566,324 | Kendrick | Aug. 25, 1896 |
| 845,744 | Blaisdell | Mar. 5, 1907 |
| 1,007,929 | Deacon et al. | Nov. 7, 1911 |
| 1,702,192 | Blomfield et al. | Feb. 12, 1929 |
| 1,946,039 | Staritzky | Feb. 6, 1934 |
| 2,355,808 | Lawlor | Aug. 15, 1944 |

FOREIGN PATENTS

| 310,792 | Germany | Jan. 18, 1922 |